US010599749B2

(12) United States Patent
Honda

(10) Patent No.: US 10,599,749 B2
(45) Date of Patent: Mar. 24, 2020

(54) INFORMATION PROCESSING APPARATUS CONFIGURED TO BLOT OUT CONFIDENTIAL INFORMATION IN A DOCUMENT, CONTROL METHOD THEREOF, AND STORAGE MEDIUM

(71) Applicant: CANON KABUSHIKI KAISHA, Tokyo (JP)

(72) Inventor: Kinya Honda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 147 days.

(21) Appl. No.: 15/894,086

(22) Filed: Feb. 12, 2018

(65) Prior Publication Data

US 2018/0239742 A1 Aug. 23, 2018

(30) Foreign Application Priority Data

Feb. 21, 2017 (JP) ................................. 2017-030044

(51) Int. Cl.
*G06F 17/21* (2006.01)
*G06F 3/0484* (2013.01)
*G06F 17/24* (2006.01)

(52) U.S. Cl.
CPC ........ *G06F 17/211* (2013.01); *G06F 3/04845* (2013.01); *G06F 17/24* (2013.01)

(58) Field of Classification Search
CPC ..... G06F 17/211; G06F 3/04845; G06F 17/24
USPC ......................................................... 715/272
See application file for complete search history.

(56) References Cited

U.S. PATENT DOCUMENTS

| | | | | |
|---|---|---|---|---|
| 5,781,785 A | * | 7/1998 | Rowe ..................... | G06F 17/211 707/999.01 |
| 7,428,701 B1 | * | 9/2008 | Gavin ..................... | G06F 17/241 715/243 |
| 8,233,193 B2 | * | 7/2012 | Shiitani ..................... | G06F 21/84 358/1.18 |
| 8,456,654 B2 | * | 6/2013 | Kelly ..................... | G06T 11/60 358/1.13 |

(Continued)

FOREIGN PATENT DOCUMENTS

| | | |
|---|---|---|
| JP | 2009245306 A | 10/2009 |
| JP | 2015203919 A | 11/2015 |
| WO | WO-2007014398 A2 * 2/2007 ............. G06F 17/24 |

*Primary Examiner* — Stephen S Hong
*Assistant Examiner* — Broderick C Anderson
(74) *Attorney, Agent, or Firm* — Rossi, Kimms & McDowell LLP

(57) ABSTRACT

When an image object that is referred to from a plurality of portions overlaps under an area to which blotting-out instructions are given, the effect of blotting out is prevented from affecting another portion against a user's intention. An information processing apparatus determines, upon receipt of instructions to apply blotting out to a specified area, whether an image object that is referred to from a plurality of reference destinations overlaps the specified area. When the image objects overlap under the specified area, it increases the number of image objects to at least two by duplicating the image object. It sets so that reference destination overlapping the specified area refers to the duplicated data of the image object for which blotting out processing is performed, and reference destination non-overlapping the specified area refers to the data of the image object for which blotting out processing is not performed.

14 Claims, 15 Drawing Sheets

(56) References Cited

U.S. PATENT DOCUMENTS

| | | | | |
|---|---|---|---|---|
| 8,938,671 B2* | 1/2015 | Eisen | ............... | G06F 21/6245 |
| | | | | 715/271 |
| 9,363,220 B2* | 6/2016 | Ubillos | ............... | H04L 51/24 |
| 2012/0206479 A1* | 8/2012 | Bryant | ............... | G09G 5/02 |
| | | | | 345/594 |
| 2018/0329597 A1* | 11/2018 | Sonnino | ............... | G06F 3/0486 |

* cited by examiner

FIG.12A

An image that is referred to from
a plurality of portions overlaps under an area to
which instructions for blotting out have been given.
However, it is not thought necessary to
apply blotting out to another reference destination
because the image is transparent.
Do you apply blotting out to another reference destination?

[ Yes ]   [ No ]

FIG.12B

An image that is referred to from a plurality of
portions overlaps under an area to which instructions
for blotting out have been given.
Do you apply blotting out to all reference destinations?

[ Yes ]   [ No ]

FIG.12C

An image that is referred to from a plurality of
portions overlaps under an area to which instructions
for blotting out have been given.
However, it is not thought necessary to apply blotting out to
another reference destination because character information
is not included.
Do you apply blotting out to another reference destination?

[ Yes ]   [ No ]

FIG.12D

An image that is referred to from a plurality of
portions overlaps under an area to which instructions
for blotting out have been given.
However, it is not thought necessary to apply blotting out to
another reference destination because there is a possibility
that the image is a background image.
Do you apply blotting out to another reference destination?

[ Yes ]   [ No ]

INFORMATION PROCESSING APPARATUS CONFIGURED TO BLOT OUT CONFIDENTIAL INFORMATION IN A DOCUMENT, CONTROL METHOD THEREOF, AND STORAGE MEDIUM

BACKGROUND OF THE INVENTION

Field of the Invention

The present invention relates to a technique to apply blotting out to an electronic document.

Description of the Related Art

An electronic document editing application has a blotting out function to delete confidential information within an electronic document. FIG. 1 is a diagram showing an example in which blotting out is applied to an electronic document in the PDF format (hereinafter, a PDF document). Here, within a page 100 of the PDF document, character objects 101 to 103 exist. In the case where a user specifies an area so as to surround the character object 103 to which the user desires to apply blotting out and gives instructions for blotting out, the specified area is painted out by a black rectangle and the results, such as a page 110, will be obtained. Information that has been deleted from a PDF document by blotting out cannot be restored. Here, the deletion means to delete information on a character code of a character and the character code is deleted in the case where a character, even part of a character, overlaps under the area to which instructions for blotting out have been given. Further, in the case of an image or a graphics, the deletion means to paint out the image at the portion that overlaps under the area in black, or to change the contents of the drawing command of the portion by changing the vector data of the graphics. By making use of the blotting out function, it is possible to prevent confidential information within an electronic document from being read. Here, it is assumed that a plurality of objects overlaps under an area to which instructions for blotting out have been given. In this case also, all the objects that overlap under the area are deleted. For example, Japanese Patent Laid-Open No. 2015-203919 has described that blotting out is applied also to the layer and the object that are not displayed. Further, Japanese Patent Laid-Open No. 2009-245306 has described that blotting out is applied to all objects in the case where a plurality of objects overlaps under a specified area.

As described above, in the case where a user desires to apply blotting out to, for example, a character object by using the blotting out function, on a condition that an image object overlaps under the area of the character object, it is not possible to apply blotting out only to the character object and blotting out is applied also to the image object. Then, in the case where the image object is referred to from a plurality of portions within the electronic document (for example, in the case where the image object is referred to from a plurality of pages), the effect of blotting out to the image object that overlaps with the character object also affects another portion. Here, the plural reference function of an image object in a PDF document is reviewed. FIG. 2 is a diagram showing an example of the structure of a PDF document. A PDF document 200 in FIG. 2 includes two pages. In a resource storage 210, data of an image 204 is stored. Then, the image 204 is referred to from both a first page 201 and a second page 202 and used as object data common to both the pages, and therefore, the image with the same contents is displayed on the respective pages. The reference destination in the plural reference is not limited to the units of pages. There is also a case where one image is referred to from a plurality of portions within the same page and at the same time, referred to from another page. Due to the plural reference function such as this, it is possible to reduce the file size of a PDF document. FIG. 3A to FIG. 3C show an example of a PDF document in which a common background image is referred to from a plurality of pages. FIG. 3A shows a background image 300, which is referred to from both the first page shown in FIG. 3B and the second page shown in FIG. 3C. In the first page in FIG. 3B, on the background image 300, four character strings 301 to 304 exist. Further, in the second page in FIG. 3C, on the background image 300, three character strings 311 to 313 exist. Then, FIG. 4A to FIG. 4C are explanatory diagrams in the case where conventional blotting out is applied to the first page in FIG. 3B. FIG. 4A shows a state of the first page after blotting out and as a result of applying blotting out by specifying an area 401 of the character string 303, the character string "Taro Yamada" is painted out so that the character string cannot be recognized visually. At this time, as a result of blotting out being applied also to an overlap area 411 with the above-described area 401 within the background image 300 referred to from a plurality of portions, as shown in FIG. 4B, an area 402 of the second page is also painted out in black. Despite that a user intends to apply blotting out only to the character string 303, the effect of blotting out affects another page because the background image 300 used in plural reference overlaps with the character string 303. FIG. 4C shows the structure of a PDF document 400 at this time. It is known that the overlap area 411 in the background image 300 within a resource storage 410 is painted out in black.

SUMMARY OF THE INVENTION

The information processing apparatus according to the present invention includes: a first determination unit configured to determine, upon receipt of instructions to apply blotting out to a specified area, whether an image object that is referred to from a plurality of reference destinations overlaps under the specified area; a duplication unit configured to increase, in a case where the first determination unit determines that the image object overlaps under the specified area, a number of pieces of data of the image object that is referred to from the plurality of reference destinations to at least two by duplicating the data of the image object; a setting unit configured to perform setting so that: the reference destination overlapping the specified area refers to the duplicated data of the image object for which blotting out processing is performed; and the reference destination non-overlapping the specified area refers to the data of the image object for which blotting out processing is not performed; and a processing unit configured to perform blotting out processing for an object that is referred to from the reference destination overlapping the specified area.

Further features of the present invention will become apparent from the following description of exemplary embodiments with reference to the attached drawings.

BRIEF DESCRIPTION OF THE DRAWINGS

FIG. 12A to FIG. 12D are each a specific example of a blotting out range selection UI screen;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<System Configuration Diagram>

Figure 5:
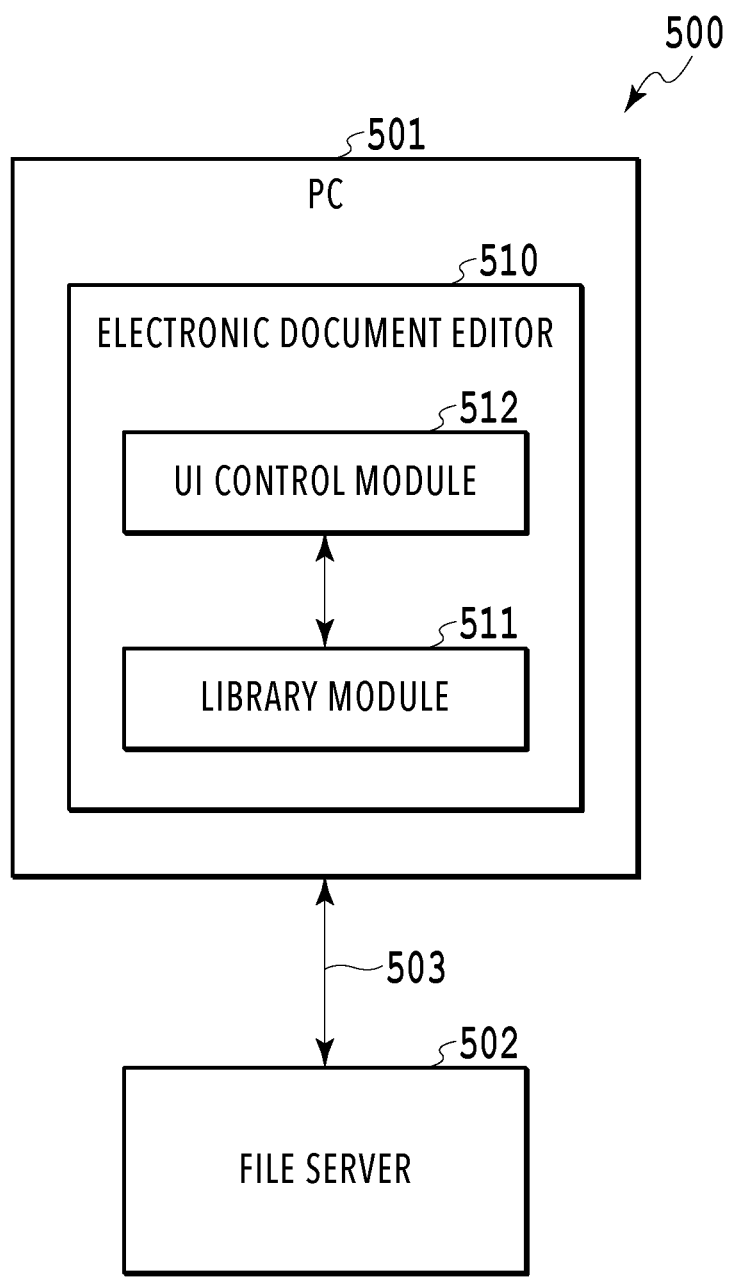
FIG. 5 is a diagram showing an entire configuration of a system that manages an electronic document.

FIG. 5 is a diagram showing an entire configuration of a system that manages an electronic document according to the present embodiment. A system 500 includes a PC 501, which is an information processing apparatus, and a file server 502 and both are connected to each other via a network 503, such as a LAN. In the client PC 501, as an application capable of editing an electronic document, an electronic document editor 510 is installed. It is possible for a user to create, edit, and print an electronic document in a predetermined format by using the electronic document editor 510. Here, explanation is given by taking an electronic document in the PDF format (hereinafter, described as a "PDF document") as an example. However, the electronic document that is the target of the present invention is not limited to the PDF document. Any electronic document may be the target as long as the document has common technical items, such as plural reference and blotting out. The electronic document editor 510 includes two software components. One is a library module 511 and this is a component that performs processing to generate and edit a PDF document, and so on. The other is a UI control module 512 and provides a user interface at the time of a user creating and editing a PDF document, specifically, the UI control module 512 generates and displays a UI screen, receives a user operation via the UI screen, and so on. The PDF document generated and edited by the electronic document editor 510 is saved in a local file system of the PC 501 or the file server 502. The PC 501 communicates with the file server 502 via the network 503.

Figure 6:
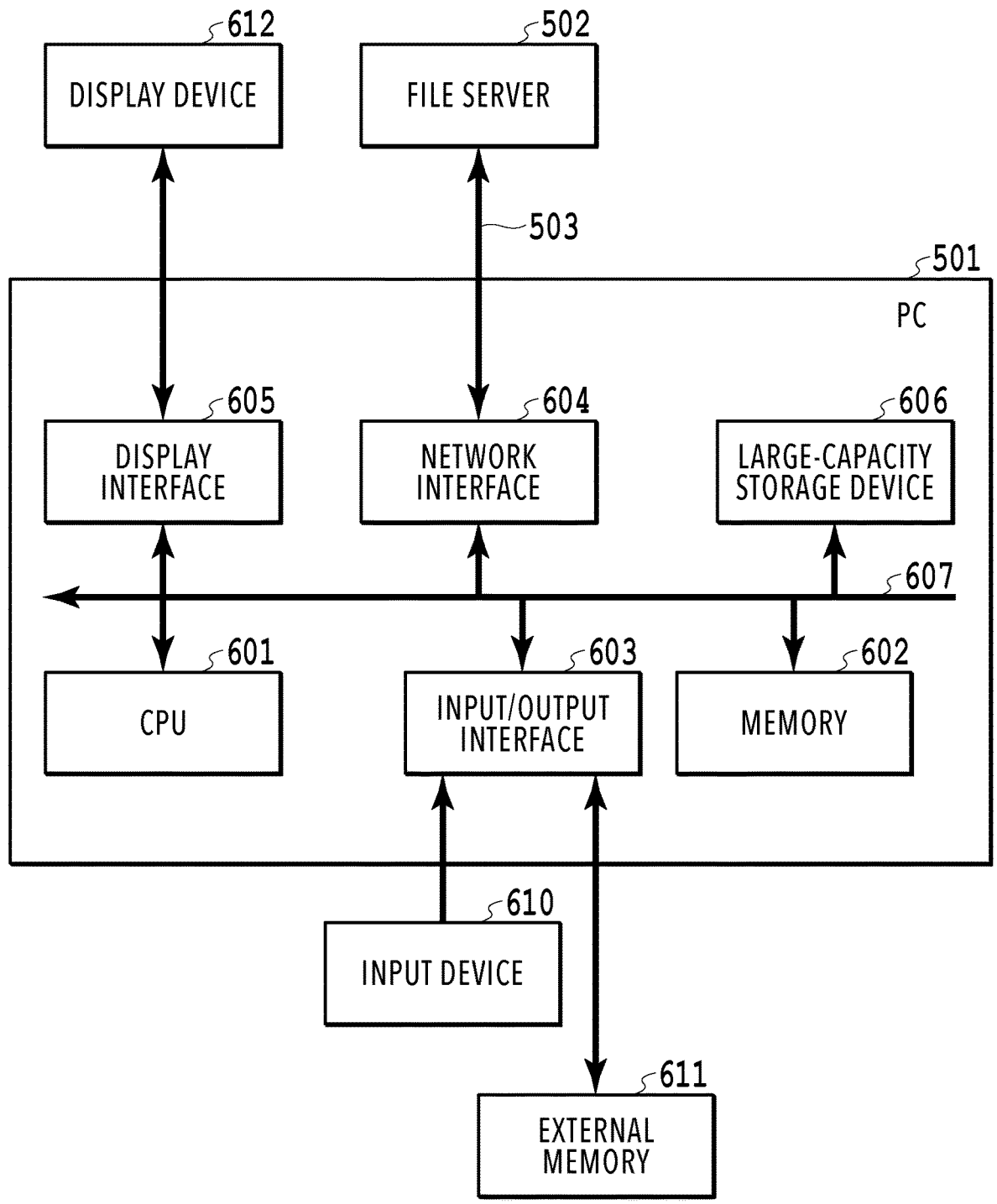
FIG. 6 is a diagram showing an example of a hardware configuration of a PC.

FIG. 6 is a diagram showing an example of a hardware configuration of the PC 501. The PC 501 includes a CPU 601, a memory 602, an input/output interface 603, a network interface 604, a display interface 605, a large-capacity storage device 606, and a system bus 607.

The CPU 601 implements various kinds of processing, such as generation and editing of a PDF document by the above-described electronic document editor 510, by running predetermined computer programs stored in the large-capacity storage device 606, such as an HDD. The memory 602 functions as a main memory, a work area, and so on, of the CPU 601. The input/output interface 603 is an interface that connects an input device 610, such as a mouse and a keyboard, and an external memory 611, such as a memory card, to the system bus 607. The network interface 604 is an interface that performs control of communication with the file server 502 via the network 503. Via this network interface 604, it is made possible for the PC 501 to perform bidirectional communication with the file server 502 and other external devices (for example, a printer and the like). The display interface 605 is an interface that controls a display of a display device 612.

Figure 1:
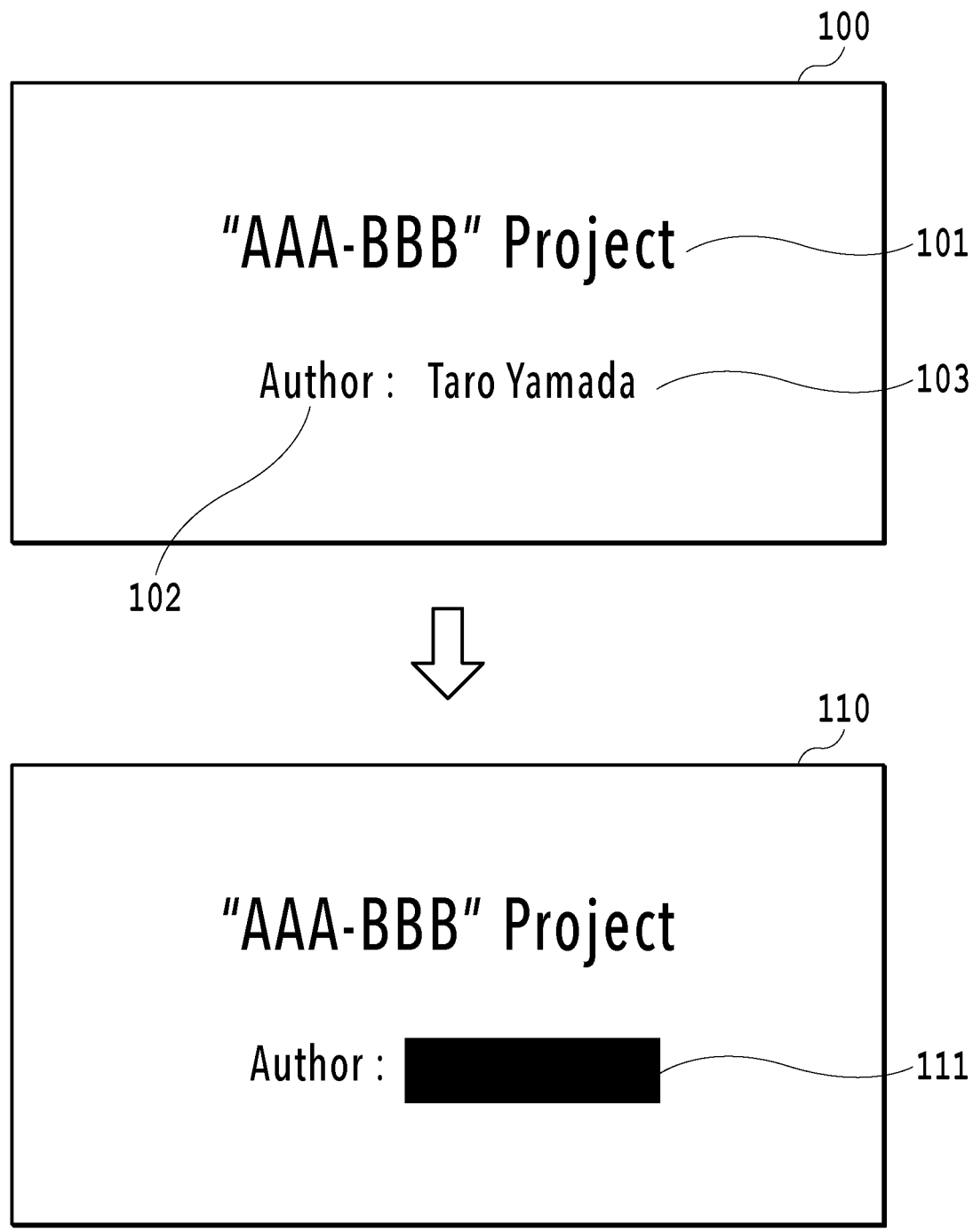
FIG. 1 is a diagram showing an example in which blotting out is applied to a PDF document.
Figure 2:
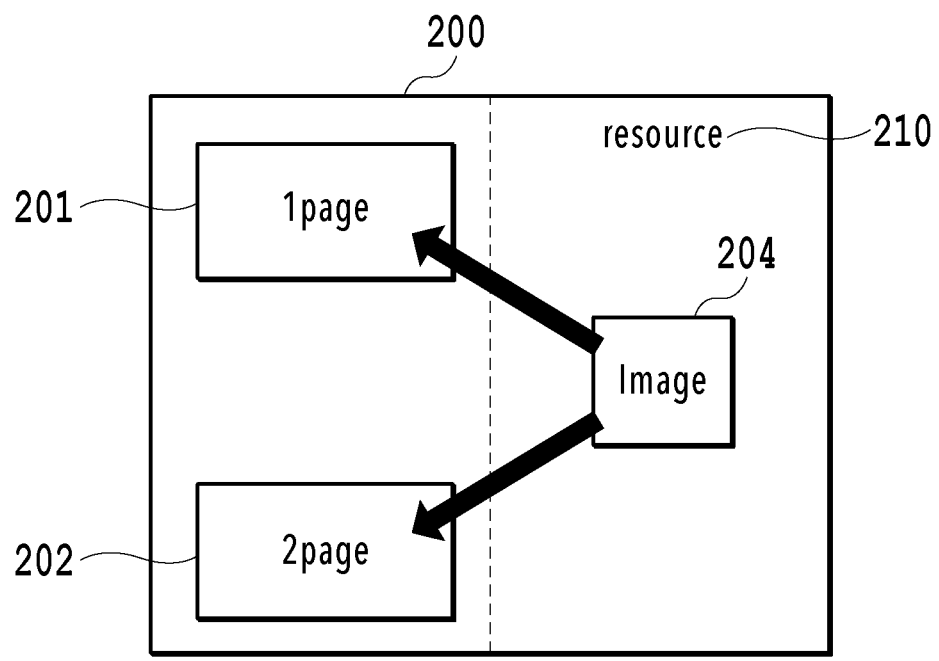
FIG. 2 is a diagram showing an example of a structure of a PDF document.
Figure 3A:
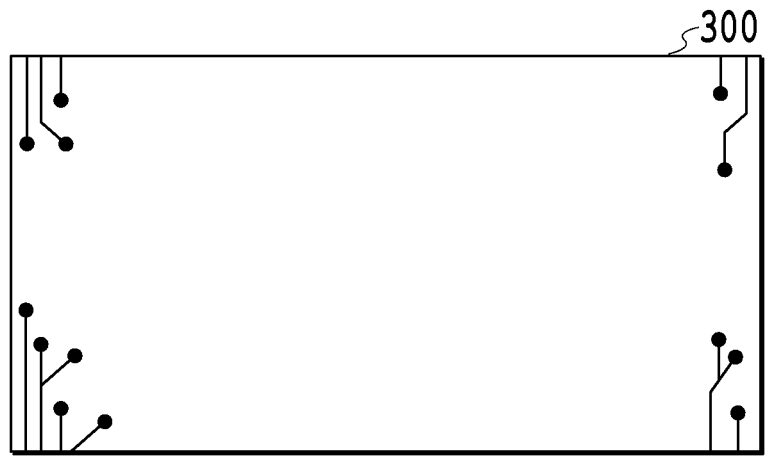
FIG. 3A to FIG. 3C are diagrams showing an example of a PDF document in which a common background image is referred to from a plurality of pages.
Figure 3B:
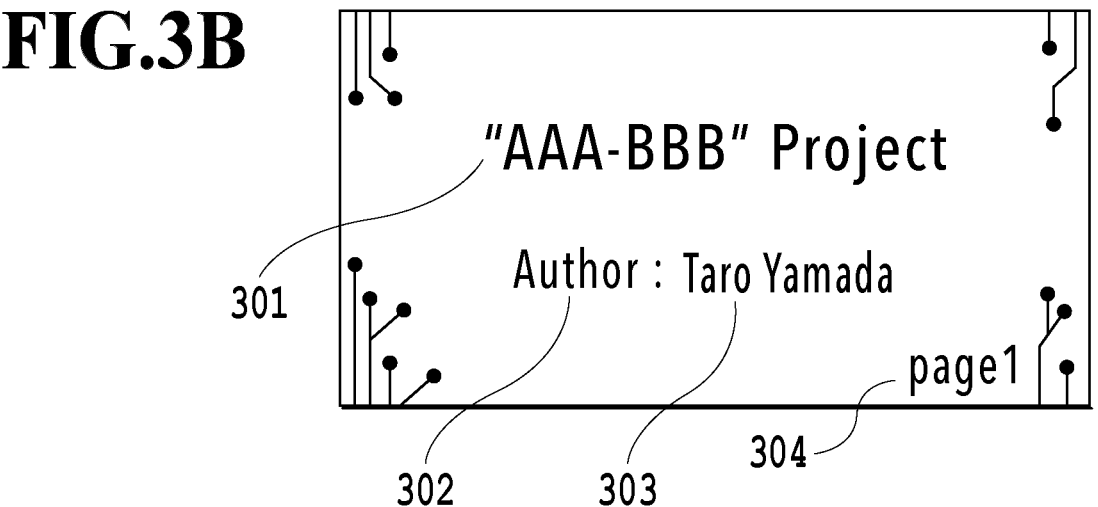
Figure 3C:
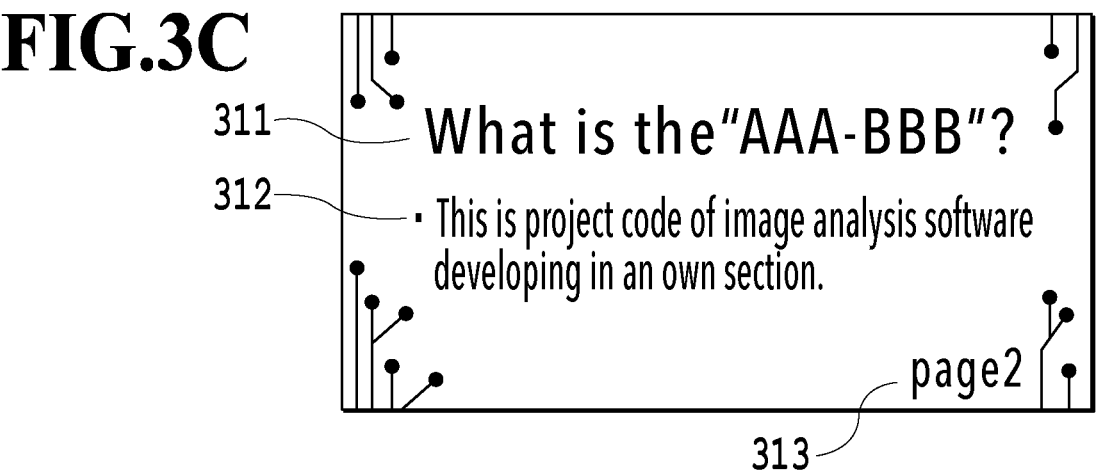

Following the above, the operation control in the electronic document editor 510 at the time of making use of the blotting out function in the present embodiment is explained. Here, before explanation of details of the present embodiment, terms are reviewed. As described previously, the present invention premises that one image object is referred to from a plurality of portions and used in common for the display at the plurality of portions. In the following, a portion referring the one image object is represented as a "reference destination". Then, the problem to be solved is that in the case where an area of a character object to be deleted or the like is specified and instructions for blotting out are given for the specified area and the specified area overlaps one of the plurality of reference destinations that refer to an image object, unintended blotting out is applied also to another reference destination. In the following, all of the plurality of reference destinations that refer to one image object are represented as "all the reference destinations". Then, one of the reference destinations, to which instructions for blotting out are given, is represented as a "blotting out reference destination" and another reference destination to which instructions for blotting out are not given is represented as a "non-blotting out reference destination". For example, in the example in FIG. 3A to FIG. 3C described previously, in which the area of the character object 303 is specified and instructions for blotting out are given for the specified area, the "blotting out reference destination" corresponds to a portion of the first page (FIG. 3B) that refers a background image, and the "non-blotting out reference destination" corresponds to a portion of the second page (FIG. 3C) that refers the background image. Then, "all the reference destinations" correspond to both portions of the first page and the second page that refer the one background image. As described at the beginning of this specification, plural reference includes a case where reference is made from a different portion within the same page, but in the following, for convenience of explanation, a case where plural reference is made from a different page is explained as an example.

Figure 7:
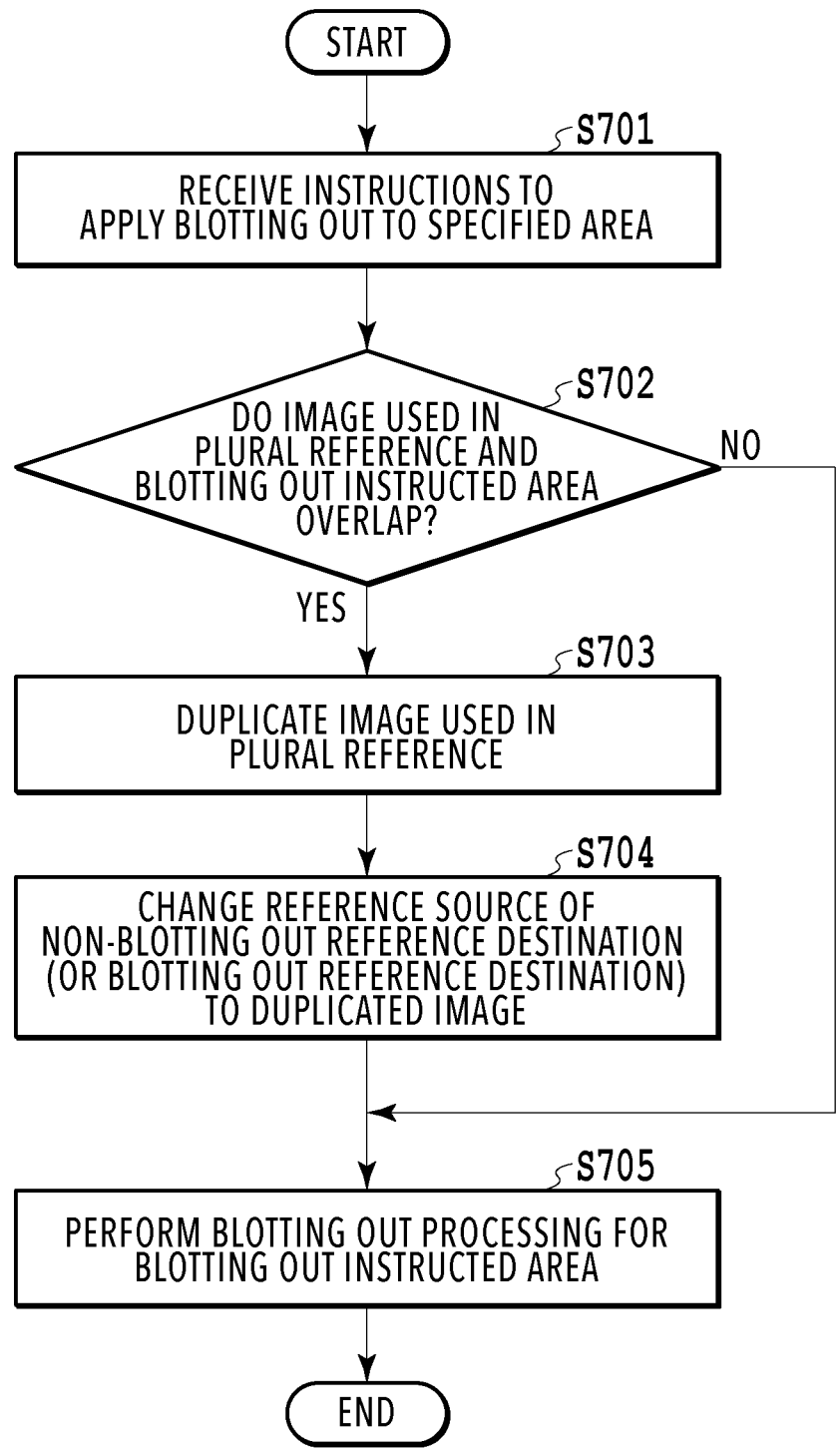
FIG. 7 is a flowchart showing a flow of operation control at the time of making use of a blotting out function in an electronic document editor according to a first embodiment.

FIG. 7 is a flowchart showing a flow of the operation control at the time of making use of the blotting out function in the electronic document editor 510 according to the present embodiment. In the present embodiment, in the case where an arbitrary area to which instructions for blotting out are given and an image used in plural reference overlap, the operation control is changed and the reference source is divided by duplicating the image used in plural reference so that the image with the same contents is referred to at the blotting out reference destination and the non-blotting out reference destination, respectively. In the following, detailed explanation is given along the flow in FIG. 7. This processing is implemented by the CPU 601 reading a predetermined program onto the memory 602 and executing this program with a user activating the electronic document editor 510 as a trigger.

At step 701, the UI control module 512 receives specification of an arbitrary area within a page and instructions to apply blotting out to the specified area by a user. The area specification is made and the instructions are given via a UI screen (not shown schematically) displayed on the display device 621.

At step 702, the library module 511 determines whether an image object (image data) used in plural reference overlaps under the specified area to which instructions for blotting out are given (hereinafter, called a "blotting out instructed area"). In the case where the results of the determination indicate that an image object used in plural reference overlaps under the blotting out instructed area, the processing advances to step 703. On the other hand, in the case where no image object used in plural reference overlaps under the blotting out instructed area, the processing advances to step 705. At step 705 in this case, blotting out processing is performed immediately for the blotting out instructed area. Specifically, for all objects that overlap under the blotting out instructed area, processing to delete the character code is performed in the case where the object is a character object and processing to paint out the area in a predetermined color (here, black) is performed in the case where the object is an image or a graphics.

At step 703, the library module 511 duplicates the image object used in plural reference, which overlaps under the blotting out instructed area. That is, data of the same image as the image object used in plural reference is generated. At step 704 that follows, the library module 511 changes the reference source of the non-blotting out reference destination (or the blotting out reference destination) to the image object duplicated at step 703. As a result of this, the data of the reference source of the blotting out reference destination and the data of the reference source of the non-blotting out reference destination are different from each other despite that the contents of the images are the same.

Figure 4A:
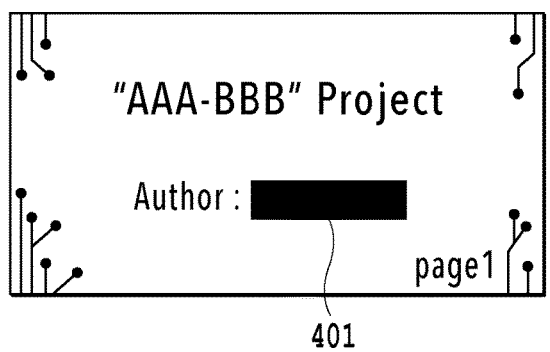
FIG. 4A to FIG. 4C are explanatory diagrams in the case where conventional blotting out is applied.
Figure 4B:
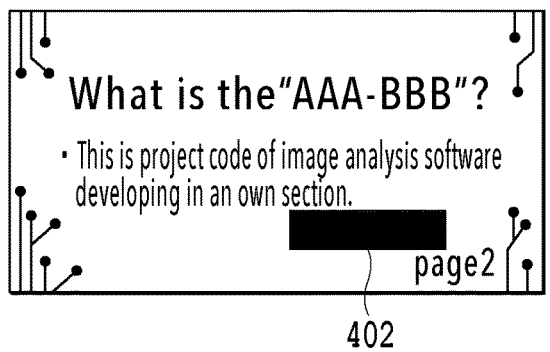
Figure 4C:
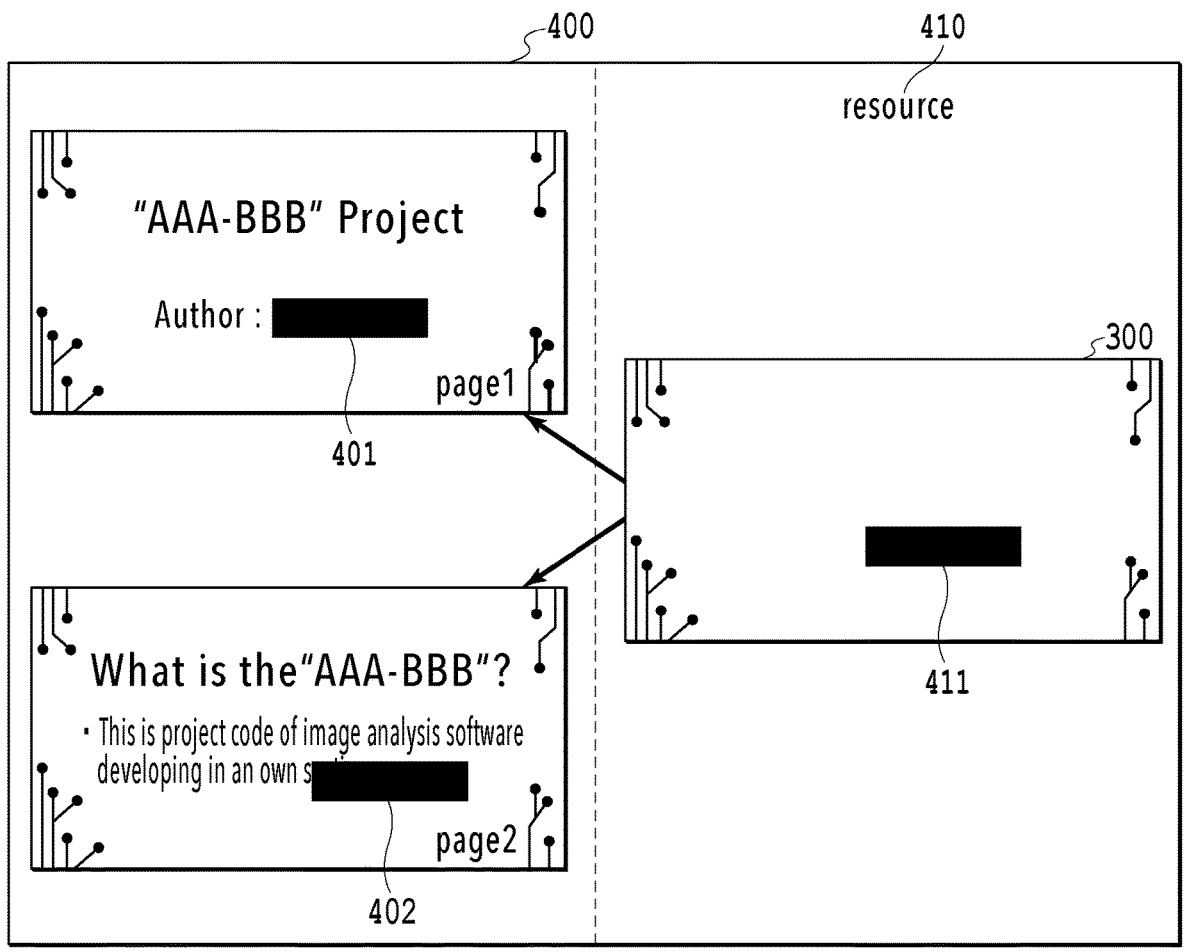
Figure 8:
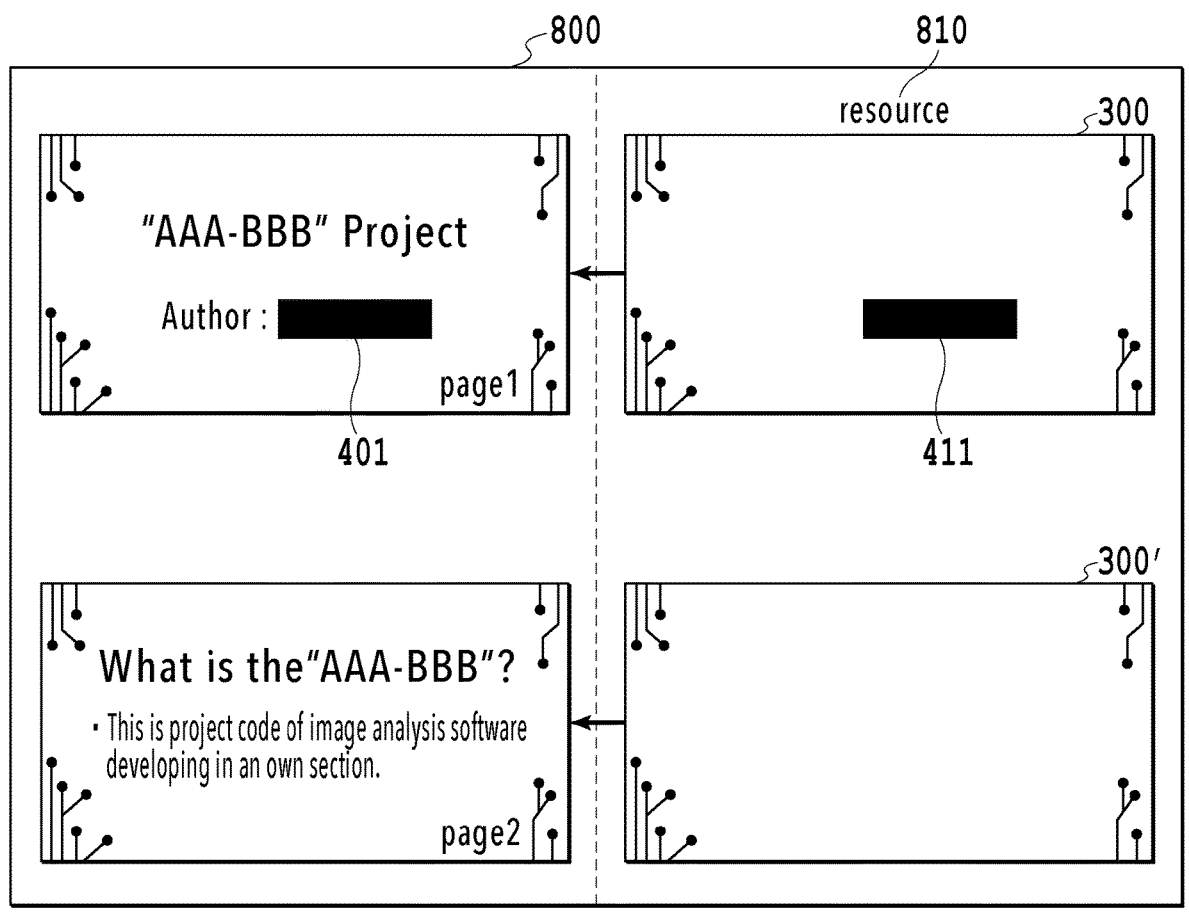
FIG. 8 is a diagram showing a structure of a PDF document after blotting out of the first embodiment is applied.

Then, at step 705, the library module 511 performs the blotting out processing for all the objects included in the blotting out instructed area. In the case where the image object has been duplicated and the reference source has been changed (steps 703 and 704), the specified character object or the like is deleted and at the same time, the overlap portion with the blotting out instructed area within the image data having become the reference source of only the blotting out reference destination is painted out in black. FIG. 8 is a diagram showing a structure of a PDF document 800 after blotting out of the present embodiment is applied to the PDF document in FIG. 4A to FIG. 4C described previously. A duplicated image 300' of the background image 300 that is referred to from a plurality of portions is generated and the duplicated image 300' is set as a new reference source of the second page that is the non-blotting out reference destination. Then, by painting out in black the overlap area 411 with the blotting out instructed area 401 within the image 300 having become the reference source of only the blotting out reference destination (first page), blotting out intended by a user is applied only to the first page.

The above is the contents of the operation control at the time of making use of the blotting out function in the electronic document editor 510 according to the present embodiment. In the present embodiment, it is supposed that the image used in plural reference is duplicated so as to generate one duplicate and this is taken to be the common reference source at the non-blotting out reference destination, but this is not limited. For example, in the case where there is a plurality of non-blotting out reference destinations, it may also be possible to duplicate the image so as to generate duplicates in the number necessary to perfectly cancel plural reference and to set a new reference source for each of the non-blotting out reference destinations. However, in this case, the data size of the PDF document becomes large in accordance with the number of duplicates of the image, and therefore, it is desirable to minimize the number of duplicates and to maintain common reference as far as possible as in the present embodiment.

Further, in the above-described embodiment, after the reference source is changed at step 704, the blotting out processing is performed at step 705, but it may also be possible to reverse the processing order. That is, by the duplication of the image object at step 703, the two background images (300, 300') with the same contents are obtained, and therefore, the blotting out processing is performed for one of them. Then, the reference source of the blotting out reference destination is taken to be the background image for which the blotting out processing has been performed and the reference source of the non-blotting out reference destination is taken to be the background image for which the blotting out processing has not been performed.

According to the present embodiment, in the case where an image object used in plural reference overlaps under an arbitrary area to which instructions for blotting out are given, the image object is duplicated and the different image objects are set as the reference sources at the blotting out reference destination and the non-blotting out reference destination. Due to this, it is made possible to apply blotting out only to the blotting out reference destination intended by a user and not to apply blotting out to the non-blotting out reference destination.

Second Embodiment

In the first embodiment, by making the image of the reference source of the blotting out reference destination differ from the image of the reference source of the non-blotting out reference destination by duplicating the image used in plural reference, blotting out is applied only to the blotting out reference destination intended by a user. However, for example, there is a case where it is desired to apply blotting out to all the reference destinations depending on the contents of an electronic document, such as a case where confidential information is included within an image used in plural reference. Consequently, an aspect is explained as a second embodiment in which it is possible for a user to select whether to apply blotting out to all reference destinations of an image used in plural reference. Explanation of the portions in common to those of the first embodiment, such as the basic configuration of the system, is omitted and in the following, different points are explained mainly.

Figure 9:
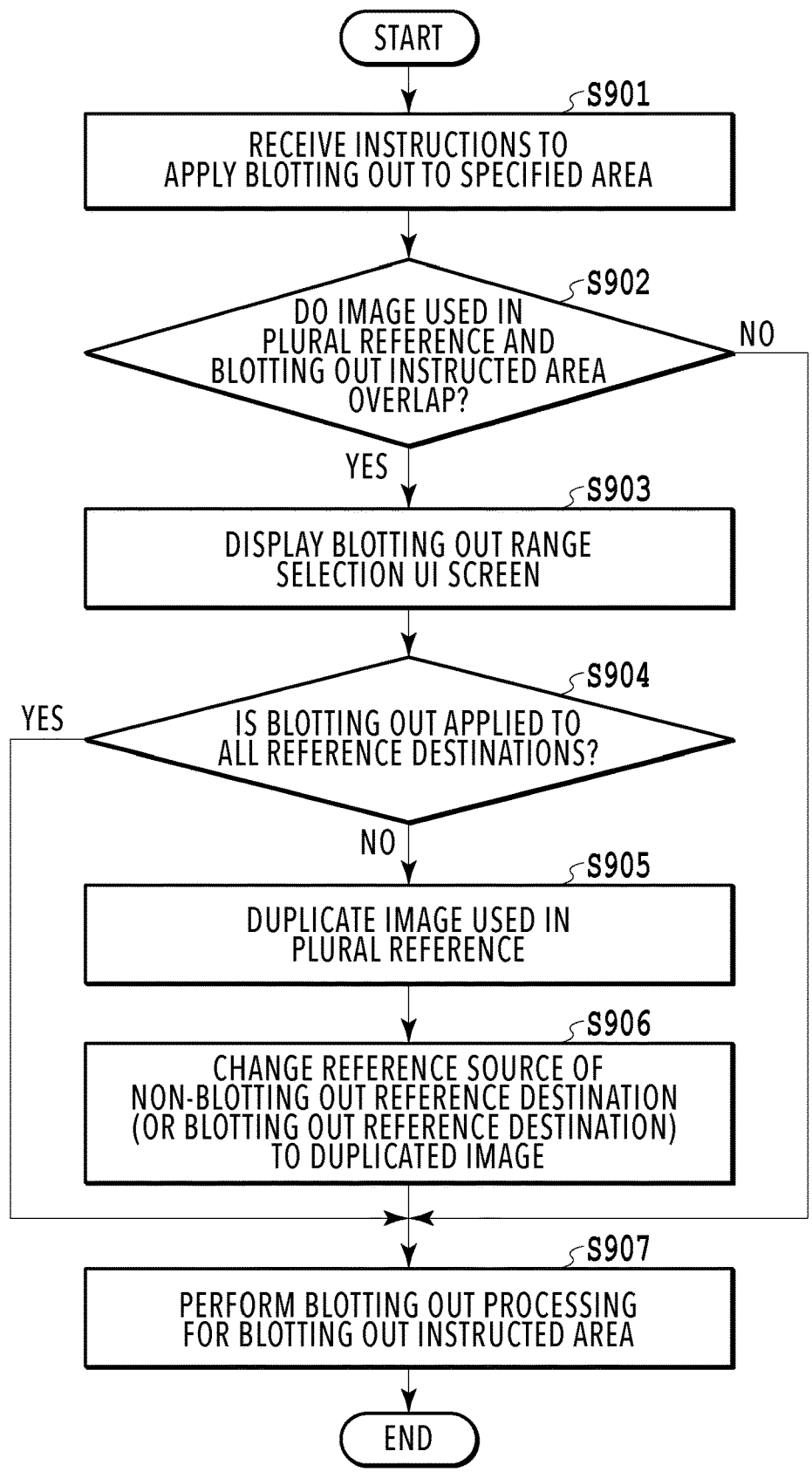
FIG. 9 is a flowchart showing a flow of operation control at the time of making use of a blotting out function in an electronic document editor according to a second embodiment.

FIG. 9 is a flowchart showing a flow of the operation control at the time of making use of the blotting out function in the electronic document editor 510 according to the present embodiment. In the present embodiment, in the case where an image used in plural reference overlaps under a blotting out instructed area, a UI screen on which to select whether to apply blotting out to all reference destinations is displayed and a user is caused to determine a range to which blotting out is applied. In the following, detailed explanation is given along the flow in FIG. 9.

Steps 901 and 902 are the same as steps 701 and 702 of the flow in FIG. 7 according to the first embodiment. In the case where an image used in plural reference overlaps under a blotting out instructed area (Yes at step 902), the processing advances to step 903. On the other hand, in the case where the image used in plural reference does not overlap under the blotting out instructed area (No at step 902), the blotting out processing is performed immediately for the blotting out instructed area (step 907).

Figure 10:
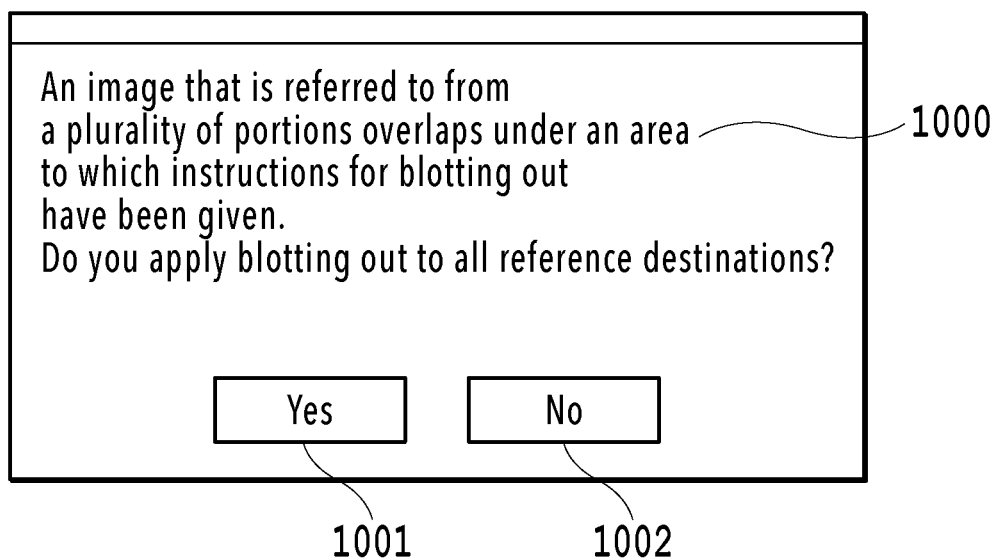
FIG. 10 is a diagram showing an example of a blotting out range selection UI screen.

At step 903, the UI control module 512 displays a UI screen for a user to select whether to apply blotting out to all the reference destinations on the display device 612. FIG. 10 is a diagram showing an example of a blotting out range selection UI screen. Within the UI screen shown in FIG. 10, a message 1000 inquiring whether to apply blotting out to all the reference destinations is displayed. A user who desires to apply blotting out to all the reference destinations presses down a "Yes" button 1001 and a user who does not desire to apply blotting out presses down a "No" button 1002. The wording of the message 1000 is an example and it is needless to say that the wording is not limited to this.

At step 904, the processing is branched according to the user selection via the blotting out range selection UI screen displayed at step 903. That is, in the case where a user presses down the "Yes" button 1001, the processing advances to step 907 and the blotting out processing is performed for the blotting out instructed area. In this case, the blotting out processing is performed also for the image used in plural reference and the area to which blotting out has been applied is displayed at all the reference destinations. On the other hand, in the case where a user presses down the "No" button 1002, the processing advances to step 905. Steps 905 to 907 correspond to steps 703 to 705, respectively, of the flow in FIG. 7 according to the first embodiment. That is, at step 905, the image used in plural reference is duplicated and at step 906 that follows, the reference source of the non-blotting out reference destination (or blotting out reference destination) is changed to the duplicated image. Then, at step 907, the character object or the like within the blotting out instructed area is deleted and at the same time, the overlap portion with the blotting out instructed area within the image that has become the reference source of only the blotting out reference destination is pained out in black.

According to the present embodiment, it is possible for a user to select whether to apply blotting out to all the reference destinations of the image used in plural reference.

Third Embodiment

In the case where the image used in plural reference is a simple background and the image itself does not include confidential information (the case as in FIG. 4A to FIG. 4C described previously), it is better not to apply blotting out to the non-blotting out reference destination. On the other hand, in the case where the image itself includes confidential information, it is considered better to apply blotting out to all the reference destinations. Further, whether an image within a PDF document is referred to from a plurality of portions is not known from the appearance of the image, and therefore, there is also a case where it is not possible for a user to determine whether to apply blotting out to all reference destinations. Consequently, an aspect is explained as a third embodiment in which whether to apply blotting out to all reference destinations of an image used in plural reference is automatically determined in the case where the image overlaps under an area to which instructions for blotting out are given. Explanation of the portions in common to those of the first and second embodiments is omitted and in the following, different points are explained mainly.

Figure 11:
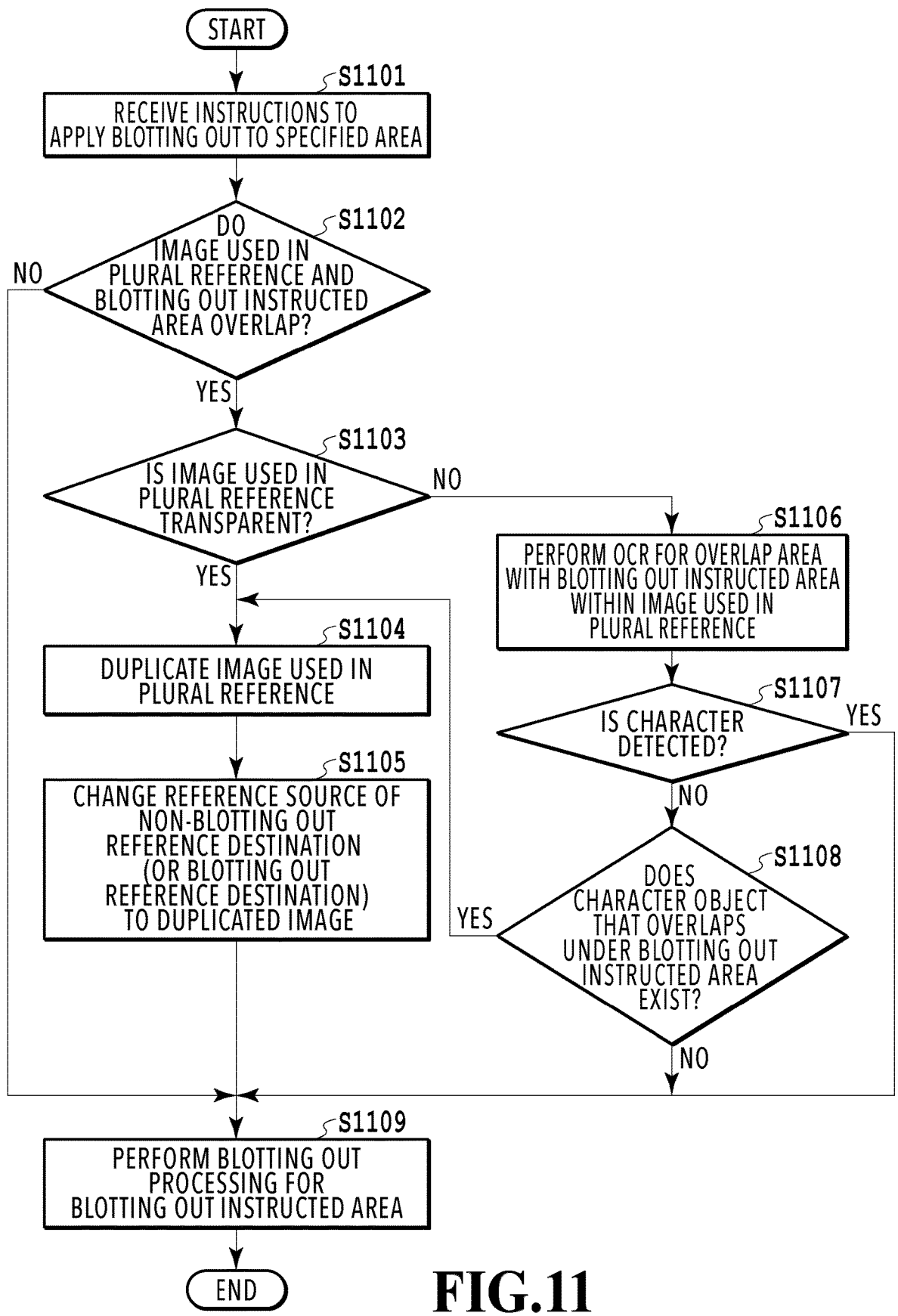
FIG. 11 is a flowchart showing a flow of operation control at the time of making use of a blotting out function in an electronic document editor according to a third embodiment.

FIG. 11 is a flowchart showing a flow of the operation control at the time of making use of the blotting out function in the electronic document editor 510 according to the present embodiment. In the present embodiment, in the case where an image used in plural reference overlaps under an area to which instructions for blotting out are given, whether to apply blotting out to all reference destinations of the image used in plural reference is automatically determined. In the following, detailed explanation is given along the flow in FIG. 11.

Steps 1101 and 1102 are the same as steps 701 and 702 of the flow in FIG. 7 according to the first embodiment. In the case where an image used in plural reference overlaps under a blotting out instructed area (Yes at step 1102), the processing advances to step 1103. On the other hand, in the case where the image used in plural reference does not overlap under the blotting out instructed area (No at step 1102), the blotting out processing is performed immediately for the blotting out instructed area (step 1109).

At step 1103, the library module 511 determines whether the image used in plural reference is transparent. The determination of whether the image is transparent is performed by, for example, referring to the presence/absence of a flag indicating that the image is transparent, which is attached to the image object. In the case where the image used in plural reference is transparent, it is possible to guess that confidential information is not included within the image. Consequently, the library module 511 determines that it is better not to apply blotting out to the non-blotting out reference destination and the processing advances to step 1104 and then the image is duplicated (step 1104) and the reference source is changed (step 1105). On the other hand, in the case where the image used in plural reference is not transparent, the processing advances to step 1106. In the case where the image used in plural reference is not transparent but a predetermined background color (the portion that overlaps under the blotting out instructed area is one color, for example white), it may also be possible handle the image so that blotting out is not applied to the non-blotting out reference destination for the same reason.

Steps 1104 and 1105 correspond to steps 703 and 704, respectively, of the flow in FIG. 7 according to the first embodiment. That is, the image used in plural reference is duplicated at step 1104 and the reference source of the non-blotting out reference destination (or the blotting out reference destination) is changed to the duplicated image at step 1105 that follows. After this, the processing advances to step 1109 and the character object or the like in the blotting out instructed area is deleted and at the same time, the overlap portion with the blotting out instructed area within the image that has become the reference source of only the blotting out reference destination is painted out in black.

At step 1106, the library module 511 performs OCR (Optical Character Recognition) processing for the overlap portion with the blotting out instructed area within the image used in plural reference. At step 1107 that follows, the processing is branched according to the results of OCR processing. In the case where no character is detected by OCR processing, the processing advances to step 1108. On the other hand, in the case where a character is detected by OCR processing, there is a possibility that confidential information is included in the image itself. Because of this, the library module 511 determines that it is better to apply blotting out to all the reference destinations and the processing advances to step 1109. Then, at step 1109, the library module 511 performs the blotting out processing for the blotting out instructed area. At this time, the blotting out processing is performed also for the image used in plural reference and the area to which blotting out has been applied is displayed at all the reference destinations.

At step 1108, the library module 511 determines whether a character object overlaps under the blotting out instructed area separately from the image used in plural reference. In the case where a character object overlaps under the blotting out instructed area, the processing advances to step 1104 and in the case where a character object does not overlap, the processing advances to step 1109. For example, in the example in FIG. 3A to FIG. 3C described previously, it is assumed that for the first page (FIG. 3B) of the PDF document, the area of the character object 303 of "Taro Yamada" is specified and instructions for blotting out are given (see FIG. 4A). In this case, under the blotting out instructed area, the character object 303 overlaps separately from the background image (FIG. 3A) used in plural reference, and therefore, the determination results at this step are "Yes". In the case where instructions for blotting out are given to the portion where the image used in plural reference and the character object overlap as described above and where the image itself does not include character information, it is possible to guess that a user desires to apply blotting out only to the character object. Consequently, the blotting out processing is performed for the blotting out instructed area through the duplication of the image (step 1104) and the change of the reference source (step 1105) so that blotting out is not applied to the non-blotting out reference destination (step 1109). On the other hand, in the case where the determination results at this step are "No" (the case where no character object overlaps under the blotting out instructed area), it is possible to guess that a user desires to apply blotting out to the specified portion at all the reference destinations of the image used in plural reference. Because of this, the processing advances to step 1109 without duplicating the image (step 1104) and changing the reference source (step 1105) and the blotting out processing is performed for the blotting out instructed area so that blotting out is applied to all the reference destinations. That is, the blotting out processing is performed also for the image used in plural reference and the area to which blotting out has been applied is displayed at all the reference destinations.

Modification Example

In place of automatically determining all as described above, it may also be possible to cause a user to determine part or all thereof. That is, it may also be possible to cause a user to determine whether to apply blotting out to all the reference destinations of the image used in plural reference by appropriately displaying the UI screen to cause a user to select a blotting out range as in the second embodiment. In the following, a specific example of a blotting out range selection UI screen according to the present modification example is explained for each UI screen according to display timing.

1) Case Where the Image Used in Plural Reference is Transparent ("Yes" at Step 1103)

In this case, for example, a UI screen as shown in FIG. 12A is displayed. In the case where a user selects "No" because confidential information is not included in the image used in plural reference, or the like, the processing advances to step 1104 and then the image is duplicated (step 1104) and the reference source is changed (step 1105). On the other hand, in the case where a user selects "Yes" because the user thinks it necessary to apply blotting out also to another reference destination, the processing advances to step 1109 and the blotting out processing is performed for the image used in plural reference without performing anything else. Due to this, the area to which blotting out has been applied is displayed at all the reference destinations.

2) Case Where a Character is Detected by OCR Processing ("Yes" at Step 1107)

In this case, for example, a UI screen as shown in FIG. 12B is displayed. In the case where a user selects "Yes" because confidential information is included in the image itself used in plural reference, or the like, the processing advances to step 1109 and the blotting out processing is performed for the image used in plural reference without performing anything else. Due to this, the area to which blotting out has been performed is displayed at all the reference destinations. On the other hand, in the case where a user selects "No" because the user does not think it necessary to apply blotting out to all the reference destinations, the processing advances to step 1104 and then the image is duplicated (step 1104) and the reference source is changed (step 1105).

3) Case Where No Character Object Overlaps Under the Blotting Out Instructed Area ("No" at Step 1108)

In this case, for example, a UI screen as shown in FIG. 12C is displayed. In the case where a user selects "Yes" because the user desires to apply blotting out to all the specified portions within the image used in plural reference (the user desires to apply blotting out also to another reference destination), the processing advances to step 1109 and the blotting out processing is performed for the image used in plural reference without performing anything else. Due to this, the area to which blotting out has been applied is displayed at all the reference destinations. On the other hand, in the case where a user selects "Yes" because the user does not think it necessary to apply blotting out to another reference destination, the processing advances to step 1104 and then the image is duplicated (step 1104) and the reference source is changed (step 1105).

4) Case Where a Character Object Overlaps Under the Blotting Out Instructed Area ("Yes" at Step 1108)

In this case, for example, a UI screen as shown in FIG. 12D is displayed. In the case where a user selects "No" because the user desires to apply blotting out only to the character object, or the like, the processing advances to step 1104 and then the image is duplicated (step 1104) and the reference source is changed (step 1105). On the other hand, in the case where a user selects "Yes", the processing advances to step 1109 and the blotting out processing is performed for the image used in plural reference without performing anything else. Due to this, the area to which blotting out has been applied is displayed at all the reference destinations.

As described above, a message according to the determination results at each determination step is displayed as needed. Due to this, it is made easier for a user to perform determination. Of course, the wording of the message shown in each of FIG. 12A to FIG. 12D is an example and any message may be displayed as long as the message includes contents in accordance with each situation.

According to the present embodiment, in the case where an image used in plural reference overlaps under an arbitrary area to which instructions for blotting out are given, it is possible to automatically determine whether to apply blotting out to all reference destinations of the image.

Fourth Embodiment

In the first to third embodiments, in the case where an image used in plural reference overlaps under a blotting out instructed area, the image used in plural reference is duplicated and the reference source is divided in accordance with a situation. This brings about a demerit that the data size of an electronic document increases. For example, in the case of the PDF document shown in FIG. 3A to FIG. 3C described previously, the data size of each character object is very small and the data of the background image (FIG. 3A) occupies most of the data size. In the case where the background image is duplicated and the data of the reference source is increased in this state, the data size is almost doubled substantially. Consequently, an aspect is explained as a fourth embodiment in which the data size is prevented from increasing as far as possible. Explanation of the portions in common to those of the first to third embodiments is omitted and in the following, different points are explained mainly.

Figure 13:
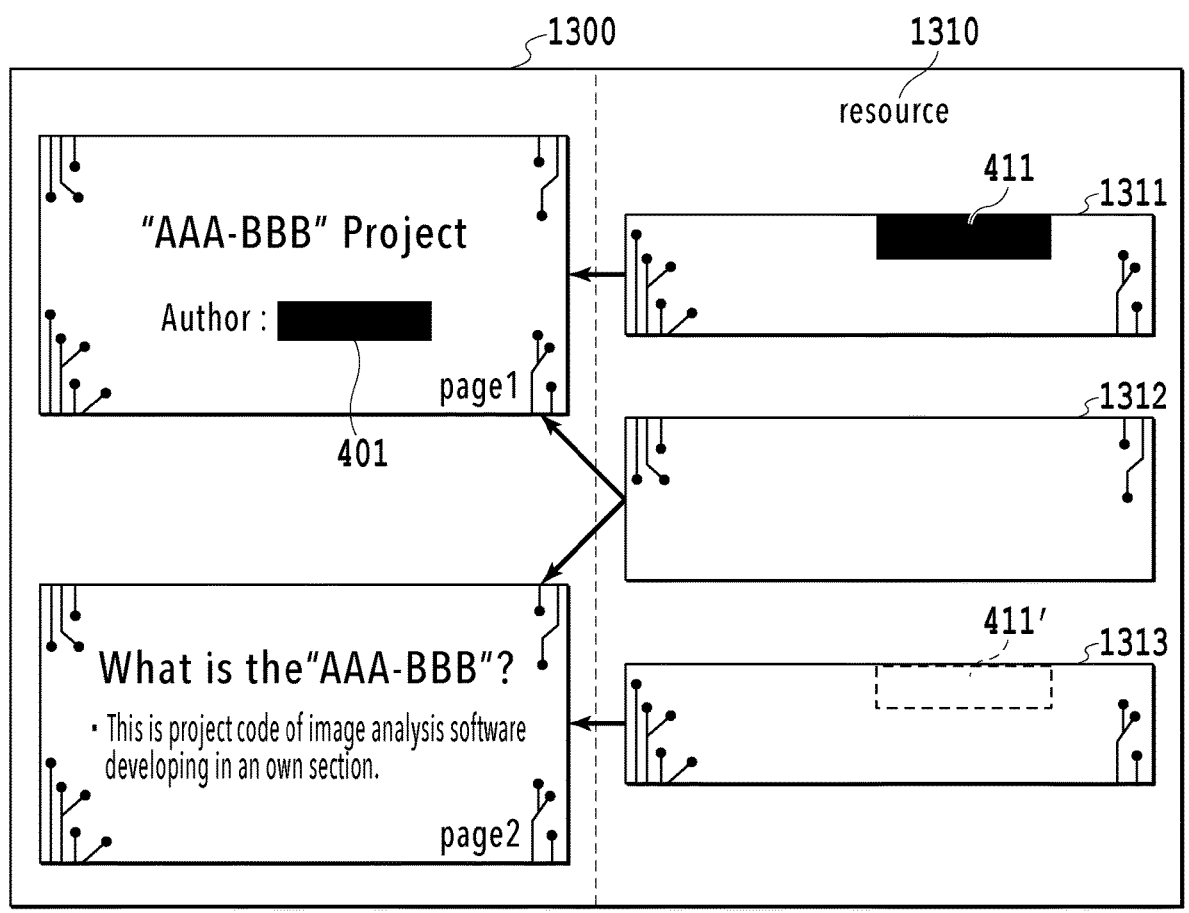
FIG. 13 is a diagram showing a structure of a PDF document after blotting out processing.

In the present embodiment, an image used in plural reference is divided into a portion that can be referred to from all reference destinations in common and a portion that cannot be referred to in common and while plural reference is maintained for the portion that can be referred to in common, for the portion that cannot be referred to in common, separate images are set again as reference sources. FIG. 13 is a diagram showing a structure of a PDF document 1300 after blotting out processing, which is generated by the present embodiment. Within a resource storage 1310, there is data of three kinds of partial image generated from the background image 300 (see FIG. 3A) that is referred to from a plurality of portions. Specifically, there exists data of a partial image 1311 that is set as the reference source of the first page, a partial image 1312 that is set as the reference source of the first page and the second page in common, and a partial image 1313 that is set as the reference source of the second page. In the partial image 1311 that is set as the reference source of only the first page, the overlap area 411 with the blotting out instructed area 401 is painted out in black by blotting out. On the other hand, in the partial image 1313 whose contents are the same as those of the partial image 1311 and which is set as the reference source of only the second page, blotting out is not applied to a portion 411' corresponding to the above-described overlap area. Then, by setting the partial image 1312 not including the area corresponding to the blotting out instructed area 401 as the reference source at all the reference destinations, an increase in the data size of the PDF document 1300 is suppressed.

Figure 14:
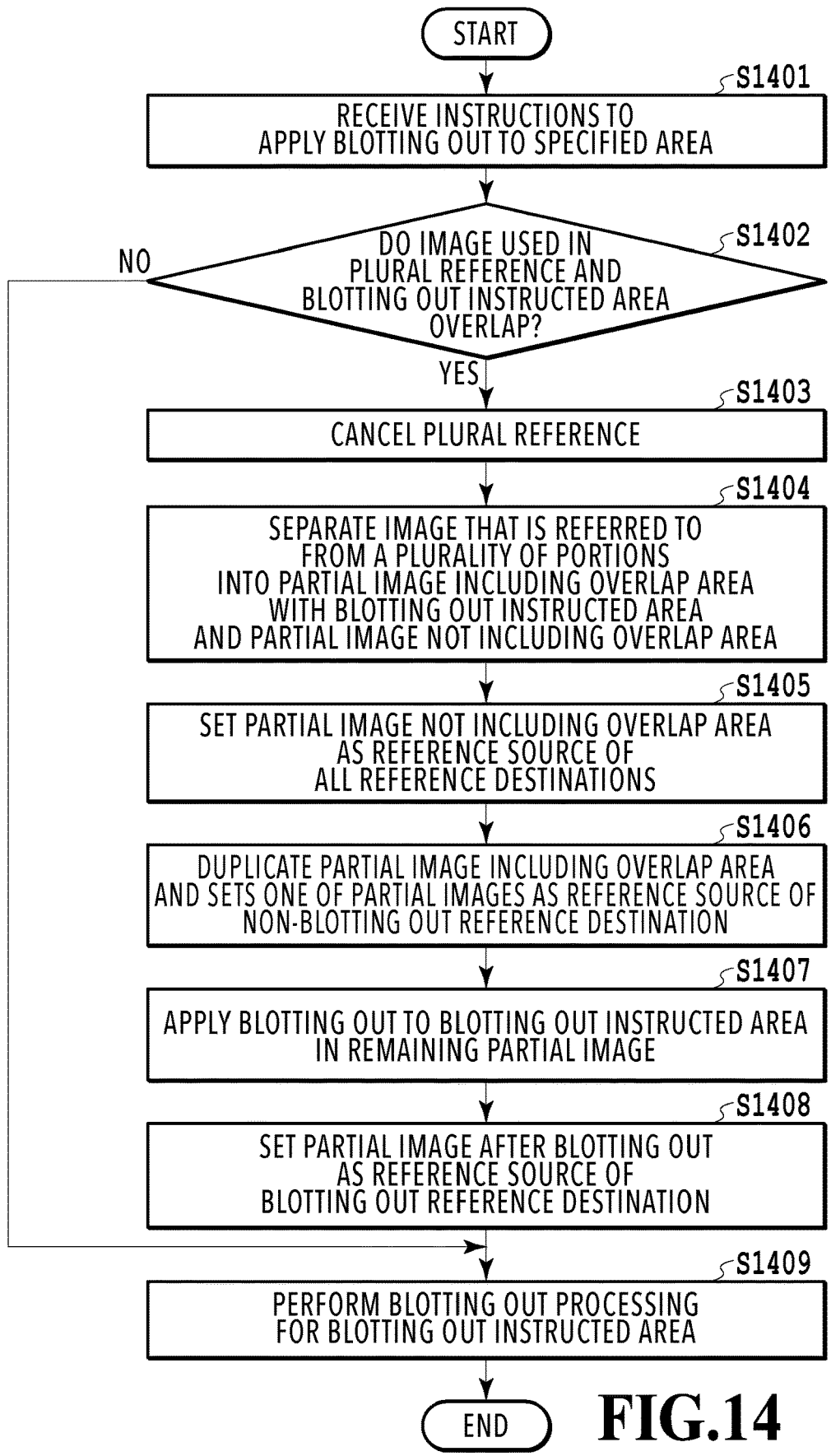
FIG. 14 is a flowchart showing a flow of operation control at the time of making use of a blotting out function in an electronic document editor according to a fourth embodiment.

FIG. 14 is a flowchart showing a flow of the operation control at the time of making use of the blotting out function in the electronic document editor 510 according to the present embodiment. In the following, detailed explanation is given along the flow in FIG. 14.

Steps 1401 and 1402 are the same as steps 701 and 702 of the flow in FIG. 7 according to the first embodiment. In the case where an image used in plural reference overlaps under a blotting out instructed area (Yes at step 1402), the processing advances to step 1403. On the other hand, in the case where the image used in plural reference does not overlap under the blotting out instructed area (No at step 1402), the blotting out processing is performed immediately for the blotting out instructed area (step 1409).

Figure 15:
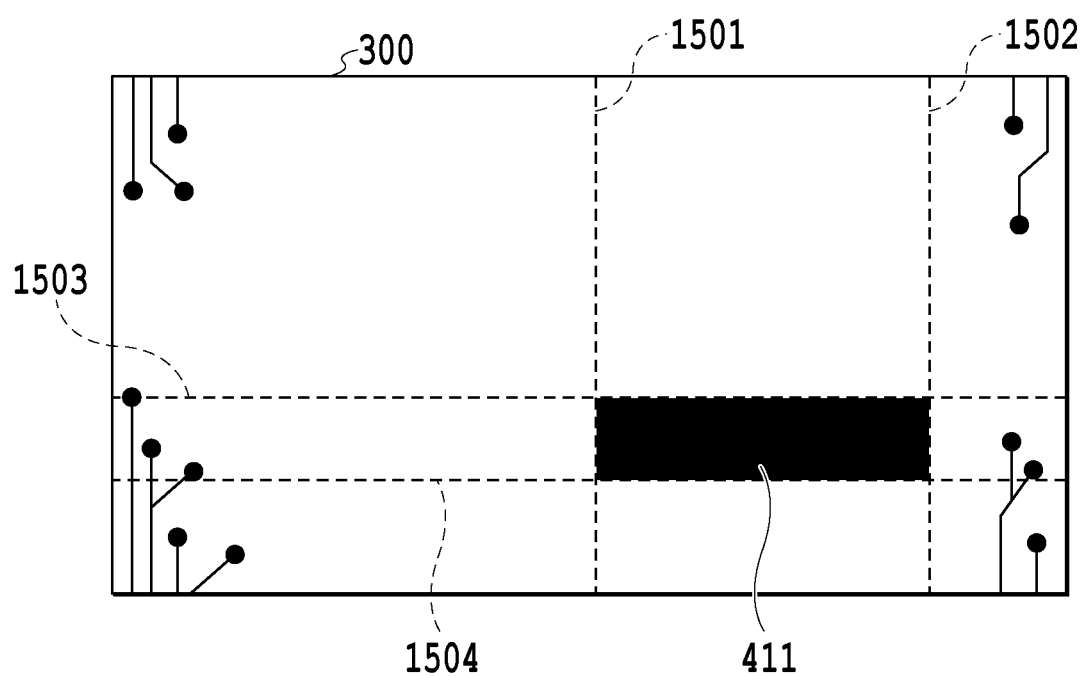
FIG. 15 is a diagram showing the way an image is separated.

At step 1403, the library module 511 temporarily breaks off the relationship of the image used in plural reference with the reference destination. At step 1404 that follows, the library module 511 divides the image whose relationship with the reference destination is broken off into a partial image including the overlap area with the blotting out instructed area and a partial image not including the overlap area. At this time, it is desirable to separate the image by taking the outer edge (one of top, bottom, left, and right sides) of the overlap area with the blotting out instructed area as a boundary so that that area of the partial image that becomes the common reference source of the plurality of reference destinations becomes the largest. FIG. 15 is a diagram showing the way the image is separated by taking the outer edge of the overlap area with the blotting out instructed area as a boundary. One of broken lines 1501 to 1504, which are the extensions of the top, bottom, left, and right sides of the overlap area 411 within the background image 300 whose relationship with the reference destination is broken off, is the candidate of the separation portion. From among these separation portion candidates, the separation portion that maximizes the area of the portion that does not include the overlap area 411 is selected. In the example in FIG. 13 described previously, the image is separated by the broken line 1503.

Next, at step 1405, the library module 511 sets the partial image not including the overlap area of the two partial images generated by the separation as the reference source of all the reference destinations. At step 1406 that follows, first, the library module 511 duplicates the partial image including the overlap area of the two partial images generated by the separation. Then, the library module 511 sets one of the original partial image and the partial image obtained by the duplication as the reference source of the non-blotting out reference destination.

At step 1407, the library module 511 performs the blotting out processing for the other remaining partial image of the original partial image and the partial image obtained by the duplication. Due to this, the partial image 1311 in FIG. 13 described previously is obtained. At step 1408 that follows, the library module 511 sets the partial image for which the blotting out processing has been performed as the reference source of the blotting out reference destination.

The above is the contents of the operation control at the time of making use of the blotting out function in the electronic document editor 510 according to the present embodiment. By the above-described control, it is possible to appropriately apply blotting out to the image used in plural reference while suppressing an increase in the data size of the PDF document.

In the above-described example, separation is performed without exception, but in the case where the area of the partial image that becomes the common reference source is small, the effect of separation is not so great. Because of this, it may also be possible to perform separation only in the case where the area of the partial image that becomes the common reference source is larger than or equal to a certain threshold value. Further, in the above-described example, the separation is performed at one portion, but the separation may be performed at a plurality of portions. In this case, the number of pieces of the image data within the resource storage increases, but the area of the image that becomes the common reference source becomes larger, and therefore, it is possible to further reduce the data size of the PDF document.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in the case where an image object that is referred to from a plurality of portions overlaps under an area to which instructions for blotting out are given, it is possible to prevent the effect of blotting out from affecting another portion against a user's intention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-030044, filed Feb. 21, 2017 which is hereby incorporated by reference wherein in its entirety.

What is claimed is:

1. An information processing apparatus comprising:
a first determination unit configured to determine whether an area in a current page specified to be blotted out overlaps an area referring to an original object that is also referred to from another page;
a duplication unit configured to duplicate the original object, based on a determination that the specified area overlaps the area referring to the original object, to obtain a duplicated object;
a setting unit configured to change a reference referred to from said another page from the original object to the duplicated object while keeping the current page referring to the original object; and
a processing unit configured to blot out the original object referred to from the current page on the specified area without blotting out the duplicated object referred to from said another page.

2. The information processing apparatus according to claim 1, further comprising:
a UI control unit configured to provide, in a case where the first determination unit determines that the specified area overlaps the area referring to the original object, a user interface to permit a user to select whether to apply blotting out to said another page,
wherein, in a case where not to apply blotting out to said another page is selected via the user interface, the duplication unit is configured to duplicate the original object, and
wherein the setting unit is further configured to change the reference so that:
in a case where applying blotting out to said another page is selected, the reference referred to from said another page is set to the duplicated object for which blotting out processing is performed; and
in a case where applying blotting out to said another page is not selected, the reference referred to from said another page is set to the original object for which blotting out processing is not performed.

3. The information processing apparatus according to claim 1, further comprising:
a second determination unit configured to determine, in a case where the first determination unit determines that the specified area overlaps the area referring to the original object, whether the original object that is referred to from said another page is transparent,
wherein, in a case where the second determination unit determines that the original object that is referred to from said another page is transparent, the duplication unit is configured to duplicate the original object.

4. The information processing apparatus according to claim 3, further comprising:
a detection unit configured to detect, in a case where the second determination unit determines that the original object that is referred to from said another page is not transparent, a character from an overlap area with the specified area in the original object,
wherein, in a case where a character is detected by the detection unit, duplication by the duplication unit and setting by the setting unit are not performed.

5. The information processing apparatus according to claim 4, further comprising:
a third determination unit configured to determine, in a case where a character is not detected by the detection unit, whether a character object that overlaps under the specified area exists,
wherein, in a case where the third determination unit determines that a character object that overlaps under the specified area does not exist, the duplication unit is configured to duplicate the original object.

6. The information processing apparatus according to claim 3, further comprising:
a UI control unit configured to provide, in a case where the second determination unit determines that the original object that is referred to from said another page is transparent, a user interface to permit a user to select whether to apply blotting out to said another page, wherein, in a case where not to apply blotting out to said another page is selected via the user interface, the duplication unit is configured to duplicate the original object, and wherein the setting unit is further configured to change the reference so that:

in a case where applying blotting out to said another page is selected, the reference referred to from said another page is set to the duplicated object for which blotting out processing is performed; and in a case where applying blotting out to the other pages is not selected, the reference referred to from the other pages is set to the original object for which blotting out processing is not performed.

7. The information processing apparatus according to claim 4, further comprising:

a UI control unit configured to provide, in a case where a character is detected by the detection unit, a user interface to permit a user to select whether to apply blotting out to said another page, wherein, in a case where not to apply blotting out to said another page is selected via the user interface, the duplication unit is configured to duplicate the original object, and wherein the setting unit is further configured to change the reference so that:

in a case where applying blotting out to said another page is selected, the reference referred to from said another page is set to the duplicated object for which blotting out processing is performed; and in a case where applying blotting out to said another page is not selected, the reference referred to from said another page is set to the original object for which blotting out processing is not performed.

8. The information processing apparatus according to claim 5, further comprising:

a UI control unit configured to provide a user interface to permit a user to select whether to apply blotting out to said another page in accordance with determination results by the third determination unit, wherein, in a case where not to apply blotting out to said another page is selected via the user interface, the duplication unit is configured to duplicate the original object, and wherein the setting unit is further configured to change the reference so that:

in a case where applying blotting out to said another page is selected, the reference referred to from said another page is set to the duplicated object for which blotting out processing is performed; and in a case where applying blotting out to said another page is not selected, the reference referred to from said another page is set to the original object for which blotting out processing is not performed.

9. The information processing apparatus according to claim 2, wherein, after the setting unit further changes the reference, the processing unit is further configured to blot out all objects that overlap the specified area.

10. An information processing apparatus comprising:

a determination unit configured to determine, upon receipt of instructions to apply blotting out to a specified area of a page, whether an image referred to from the page and to be arranged on the specified area is referred to from another page;

a separation unit configured to separate, in a case where the determination unit determines that the image is referred to from another page, the image into a first partial image overlapping the specified area on the page and a second partial image not including the specified area on the page;

a first setting unit configured to set the second partial image obtained by the separation unit to be referred to from the page and said another page;

a duplication unit configured to duplicate the first partial image;

a blotting out unit configured to blot out one of the first partial image and the duplicated first partial image;

a second setting unit configured to set the blotted out first partial image to be referred to from the page to which the instructions have been given; and a third setting unit configured to set the non-blotted out first partial image to be referred to from said another page to which the instructions have not been given.

11. The information processing apparatus according to claim 10, wherein the separation unit is further configured to perform separation so that an area of the second partial image, which becomes a reference source of the page and said another page, becomes large.

12. The information processing apparatus according to claim 10, wherein the separation unit is further configured to perform the separation in a case where the area of the second partial image is larger than a predetermined area.

13. A control method of an information processing apparatus that performs blotting out processing, the control method comprising the steps of:

determining whether an area in a current page specified to be blotted out overlaps an area referring to an original object that is also referred to from another page;

duplicating the original object, based on a determination that the specified area overlaps the area referring to the original object, to obtain a duplicated object;

changing a reference referred to from said another page from the original object to the duplicated object while keeping the current page referring to the original object; and blotting out the original object referred to from the current page on the specified area without blotting out the duplicated object referred to from said another page.

14. A non-transitory computer readable storage medium storing a program for causing a computer to perform a control method of an information processing apparatus that performs blotting out processing, the control method comprising the steps of:

determining whether an area in a current page specified to be blotted out overlaps an area referring to an original object that is also referred to from another page;

duplicating the original object, based on a determination that the specified area overlaps the area referring to the original object, to obtain a duplicated object;

changing a reference referred to from said another page from the original object to the duplicated object while keeping the current page referring to the original object; and blotting out the original object referred to from the current page on the specified area without blotting out the duplicated object referred to from said another page.

* * * * *